UNITED STATES PATENT OFFICE.

ALFRED HERBERT, OF CHESTERTOWN, MARYLAND.

IMPROVEMENT IN METHODS OF ANALYZING SOILS.

Specification forming part of Letters Patent No. 149,038, dated March 31, 1874; application filed March 7, 1874.

*To all whom it may concern:*

Be it known that I, ALFRED HERBERT, of Chestertown, in the county of Kent and State of Maryland, have invented certain new and useful Improvements in Analyzing Soils; and I do hereby declare the following to be a full, clear, and exact description thereof.

My invention relates to the art of combining and using such ingredients of plant-food as may be easily assimilated by the plant with some ten different plats of land homogeneous with and in the immediate vicinity of the field to be analyzed, that I may be able to discover with certainty what ingredients of the plant-food are contained in the soil, and what it will be necessary to supply in order that a perfect plant of any known species may be grown upon that field.

It has long been recognized as a fact of the first importance to the agriculturist that he should be acquainted with the character of his soil, and should know what was in his land and what he must furnish it with from without, and the aid of the analytical chemist has been put in operation for at least fifteen or twenty years to supply him with this information; but, from the beginning to the end of the efforts of the analytical chemists, the results have been unsatisfactory, not because they have been unable to find out what ingredients were in the soil, but because it has been found impracticable to determine the exact composition of the solvent which has supplied the roots of the plant in the soil with plant-food during the season of the plant's growth.

The rain-water in the soil is what forms the main solvent of the ingredients of plant-food, but this is modified by the different quantities of carbonic acid which may be generated in the soil by the decomposition of organic matter therein; also, by the ammonia in the soil or in the air which may have been generated by the decomposition of animal matter and of some kinds of vegetable matter; it is also sometimes changed by small quantities of nitric acid in the moisture of the atmosphere, generated by electrical discharges in the vicinity during a thunder-storm. As it is well known to every intelligent chemist that the presence of each or all of these substances in the rain-water would very materially increase the solvent power of it, and that the difference in the degree in which each was found combined with it would very materially modify its power of taking up the different ingredients of plant-food from the soil, it is manifest that it is not in the power of the chemist, in his laboratory, to say with precision and certainty that he can prepare the exact equivalent of the solvent or solvents which convey food into the roots of the plants during the season of vegetable growth. He can find out every element which may have existed in the soil, but this is not what the agriculturist wishes to know, as there may be many ingredients of plant-food locked up, as it were, in the silicates of the soil, which are not soluble in ordinary rain-water, nor in weak solutions of carbonic acid, nor in weak solutions of ammonia, nor in weak solutions of nitric acid.

The feldspathic sand from disintegrating granite or porphyry or trap, for instance, contains potash and lime. Yet none of this is conveyed to the roots of plants by the rain-water containing this undecomposed sand. The assertion is, therefore, repeated that the analytical chemist cannot prepare a solvent which shall be the exact equivalent of that in the soil during the season of vegetable growth, and cannot dissolve out of the specimen which he has for analysis the exact ingredients and in the same proportions as may have been dissolved during the season of plant growth out of the soil where the plant is growing. He will invariably have his solvent either too powerful or too weak to be the exact equivalent of that in the soil, and hence the source of errors in his analysis; but, if the plant is made the analyst of the soil and the experimental plats are taken in those parts of the field which are of the same homogeneous character with the whole field, and are exposed to the same weather and rains, and winds and sun, as the balance of the field, the relative growth of the plant on the different experimental plats (manured with the complete manure in No. 1, and with the complete manure, less one of the chief ingredients in each of the others; the complete manure, less the phosphate of lime in No. 2; the complete manure, less the silicate of potash in No. 3; the complete manure, less the sulphate of ammonia in No. 4; the complete manure, less the sulphate of lime in No. 5; the complete manure, less chloride of sodium in No. 6; the complete manure, less sulphate of magnesia in No. 7; the complete manure, less sulphate of iron in No. 8; the complete manure, less nitrate of manganese in No. 9; and the complete manure, less sulphate of alumina in No. 10) will tell the whole story at harvest-time; and the farmer will be able to see what his land has embodied in the soil in an assimilable condition, and what he must buy and put on his land to produce perfect plants.

I simply have prepared ten different lots of fertilizers, which shall be all different in the aggregate composition, as described above, and have ten equal experimental plats of land of (five and a half yards) one rod square in each, all fertilized and planted with the same plant—the plat No. 2 with phosphate of lime left out, plat No. 3 with silicate of potash left out, and so on; and, as the plant can get its mineral food only from two sources, (from the soil and from the fertilizers used,) whenever a perfect plant is grown on a plat with one ingredient of plant-food left out it is proved that the soil must have contained that ingredient in sufficient quantity to supply the needs of the plant without assistance of artificial means; and whenever the plant failed to grow to equal perfection on the plat manured with one ingredient left out, it is manifest that the soil does not contain that ingredient in sufficient quantity to grow a well-matured plant.

Having thus fully described the nature, object, and purpose of my invention, what I claim therein as new, and desire to secure by Letters Patent, is—

The combination and application of the following nine ingredients of plant-food, viz: Acid phosphate of lime, silicate of potash, sulphate of ammonia, sulphate of lime, chloride of sodium, sulphate of magnesia, sulphate of iron, nitrate of manganese, and sulphate of alumina, or their chemical equivalents, with the ten experimental plats, in the manner and for the purpose herein described, whereby I can determine with great precision and accuracy what ingredients any soil contains, and what is necessary to add in order to grow a perfect plant of any kind.

ALFRED HERBERT.

Witnesses:
  A. B. STOUGHTON,
  EDMUND MASSON.